UNITED STATES PATENT OFFICE.

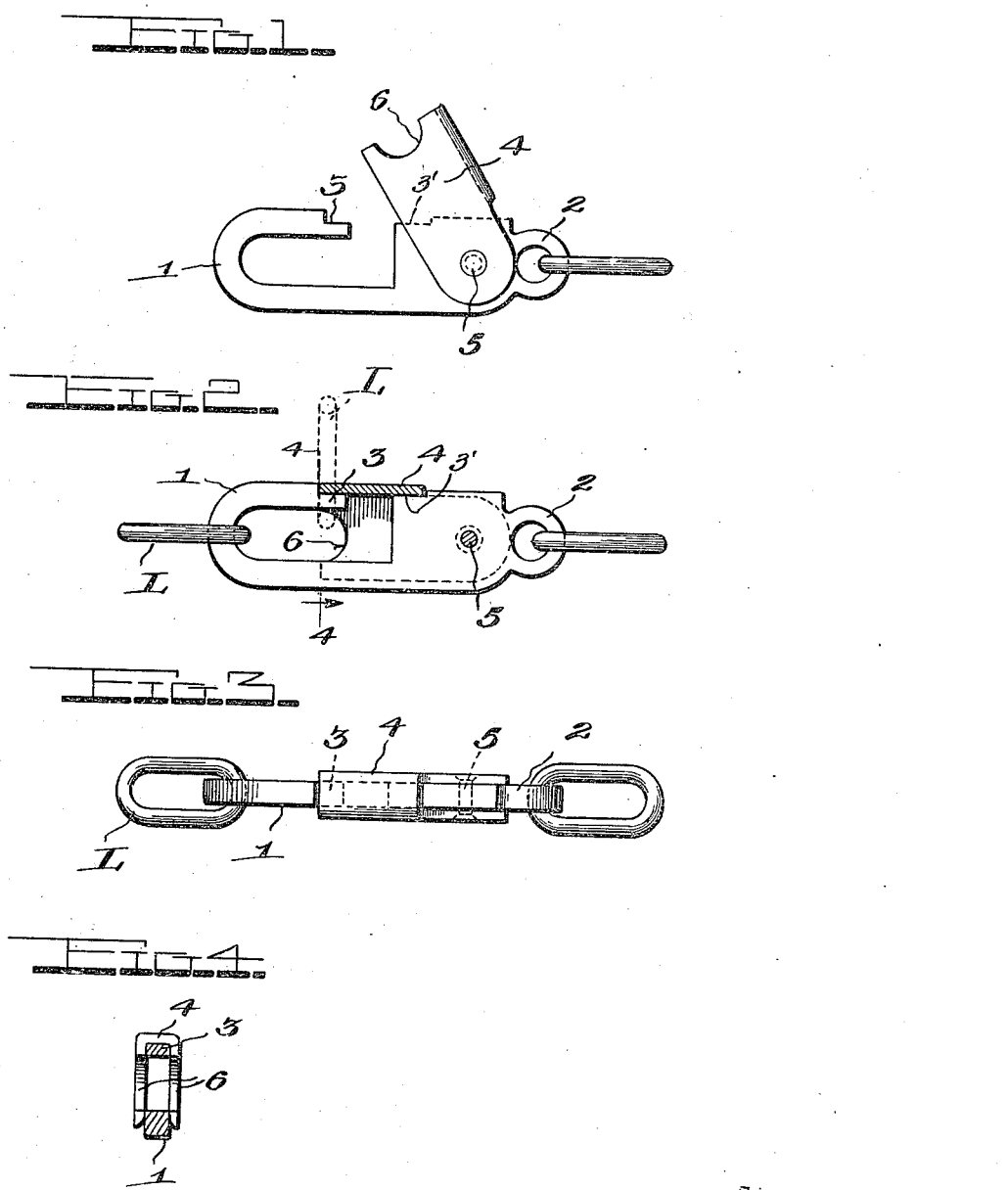

SAMUEL ANDERSON, OF PAWTUCKET, RHODE ISLAND.

SNAP OR CATCH.

1,203,958.

Specification of Letters Patent.   Patented Nov. 7, 1916.

Application filed March 24, 1916.   Serial No. 86,379.

*To all whom it may concern:*

Be it known that I, SAMUEL ANDERSON, a citizen of the United States, residing at Pawtucket, in the county of Providence and State of Rhode Island, have invented a new and useful Improvement in Snaps or Catches, of which the following is a specification.

This invention relates to certain new and useful improvements in snaps or catches, and the primary object of the invention is to provide a snap or catch which has means for preventing accidental opening should the chain exert pressure in the direction of opening of the catch.

Still further, the invention aims to provide a snap or catch which involves but a few parts, enabling cheap production, and also to provide a snap or catch which can be easily operated and which will still be efficient in its action of holding the chain.

Further and other objects will be later herein set forth and manifested in the course of the following description.

In the drawings, Figure 1 is a side elevation showing the catch in open position. Fig. 2 is a view, partly in section, showing the catch in closed position. Fig. 3 is a top plan view, and Fig. 4 is a section on the line 4—4 of Fig. 2.

In proceeding in accordance with the present invention a hook member is employed which has a hook 1 on the end, and an eye 2 on its opposite end. The bill of the hook is formed with a cut-out part 3 and the side edge of the member opposite to the bill has a similar cut-out 3'. A keeper 4 having a part of U-form in cross section is pivoted at 5 to the end of the hook member adjacent the eye 2 and at such distance from the tongue so that when the keeper is in locking position its ends will seat in the cut-outs 3 and 3' as depicted more clearly in Figs. 2 and 3 of the drawings.

The keeper has the legs of its inner end provided with U-shaped cut-out parts 6, which, should the link L move to the dotted line position of Fig. 2, will receive the link and enable the same to abut the tongue 3, with the result that the latter will relieve the keeper of any pressure and consequently will prevent the keeper from moving to the position of Fig. 1, which latter position allows the link to be disengaged from the hook.

The keeper is formed of material having slight spring properties, so that when in the position shown in Figs. 2–4, the free ends of the legs of the keeper will firmly and frictionally engage or clampingly embrace opposite sides of the tongue.

To open the catch, it is simply necessary to lift the keeper 4, or to effect relative spreading or separating movement between the keeper and hook member, and to lock the parts, the keeper is moved inwardly to cause the free end thereof to seat in the cut-out 3.

It will thus be apparent from the foregoing that regardless of the position the link L may assume, it is impossible for same by reason of the cut-outs 6 to move to a position where it can exert opening pressure on the keeper or in other words, the hook member is the part which the link always engages regardless of the position of the link, the hook member thus acting to prevent the link from engaging the keeper to an extent which will allow the link to release or open the keeper. Should the chain engage the U-cut-out 6 at the side of the latter opposite to the sides adjacent the cut-out 3, it will be apparent that the tendency of the chain will be to ride on the walls formed by cut-outs 6 and to further move the keeper in its locking direction, in which event the dotted link shown in Fig. 2, will be at the bottom of the catch of Fig. 2, instead of at the top thereof, as shown.

Having thus described my invention, what I claim as new and desire to secure by Letters Patent is—

1. In a catch, a hook member having a hook on one end and eye on its other end, the bill of the hook and the side edge of the member opposite to the bill being each formed with an outwardly facing cut-out, and a keeper having a part of U-form in cross section pivoted to the eye end of the hook member and having its ends receivable in the cut-outs, said keeper having its inner end formed with U-shaped cut-outs whereby if the chain moves to a position to engage the keeper, the cut-outs of the latter will deflect the chain to a position where the chain will engage the hook.

2. In a catch, a hook member having a hook at one end terminating in a bill directed toward the body portion of said hook member, said body portion and hook bill being formed with outwardly facing cut-outs and the wall of which oppose each other, and a keeper pivoted to the body portion for seating in the cut-outs of the latter and hook bill, said keeper when in operative position abutting the end walls of the cut-outs whereby to reinforce the hook against being sprung transversely of the body portion.

In testimony whereof I have signed my name to this specification in the presence of two subscribing witnesses.

SAMUEL ANDERSON.

Witnesses:
ADA E. HAGERTY,
J. A. MILLER.

Copies of this patent may be obtained for five cents each, by addressing the "Commissioner of Patents, Washington, D. C."